United States Patent
Baiden

(10) Patent No.: US 9,728,078 B2
(45) Date of Patent: Aug. 8, 2017

(54) TELEROBOTIC COMMUNICATIONS SYSTEM AND METHOD

(75) Inventor: Gregory Baiden, Lively (CA)

(73) Assignee: Penguin Automated Systems, Inc., Naughton (CA)

( * ) Notice: Subject to any disclaimer, the term of this patent is extended or adjusted under 35 U.S.C. 154(b) by 979 days.

(21) Appl. No.: 13/882,131

(22) PCT Filed: Oct. 26, 2011

(86) PCT No.: PCT/CA2011/050671
§ 371 (c)(1),
(2), (4) Date: Apr. 26, 2013

(87) PCT Pub. No.: WO2012/055043
PCT Pub. Date: May 3, 2012

(65) Prior Publication Data
US 2013/0226343 A1    Aug. 29, 2013

(30) Foreign Application Priority Data
Oct. 26, 2010    (CA) ..................................... 2718870

(51) Int. Cl.
*G08C 17/00*    (2006.01)
*G05D 1/00*     (2006.01)
(Continued)

(52) U.S. Cl.
CPC ................ *G08C 17/00* (2013.01); *B25J 5/00* (2013.01); *G05D 1/0022* (2013.01); *H04B 7/155* (2013.01);
(Continued)

(58) Field of Classification Search
CPC ......... G05D 1/0022; G05D 2201/0207; G05D 1/0248; B25J 13/006; B25J 13/06;
(Continued)

(56) References Cited

U.S. PATENT DOCUMENTS 6,484,083 B1 *  11/2002  Hayward ................. B60D 1/00
                                                       180/24.05
6,488,306 B1 *  12/2002  Shirey ..................... B60D 1/00
                                                       280/474
(Continued)

FOREIGN PATENT DOCUMENTS

WO    WO2012055043    5/2012

OTHER PUBLICATIONS

Canadian Intellectual Property Office, International Search Report and Written Opinion for PCT Application No. PCT/CA2011/050671, mail date Feb. 3, 2012.
(Continued)

*Primary Examiner* — Jason Holloway
(74) *Attorney, Agent, or Firm* — SoCal IP Law Group LLP; John E. Gunther

(57) ABSTRACT

A telerobotic communications system including a teleoperation center to transmit control data and receive non-control data by wireless connection to and from a first mobile telerobot and indirectly to and from a second mobile telerobot. The first mobile telerobot includes a transceiver for receiving and transmitting control and non-control data, respectively, and also a repeater for relaying control data to a second mobile telerobot and relaying non-control data back to the teleoperation center. The system allows the second mobile telerobot to travel beyond a communications-enabled distance of the wireless signal emitted directly by the teleoperation center. The system may also include wireless repeaters to extend the communications distance between the first and second telerobots.

10 Claims, 10 Drawing Sheets

(51) Int. Cl.
*H04B 7/155* (2006.01)
*B25J 5/00* (2006.01)
(52) U.S. Cl.
CPC ......... *G08C 2201/40* (2013.01); *Y10S 901/01* (2013.01); *Y10S 901/08* (2013.01)
(58) Field of Classification Search
CPC ......... B25J 5/007; B25J 5/00; G08C 2201/40; G08C 17/00; H04B 7/155; H04B 10/29; Y10S 901/08; Y10S 901/01
See application file for complete search history.

(56) References Cited

U.S. PATENT DOCUMENTS

| | | | | |
|---|---|---|---|---|
| 6,523,629 | B1* | 2/2003 | Buttz | B60D 1/00 180/14.2 |
| 6,836,701 | B2* | 12/2004 | McKee | G05D 1/0274 318/568.11 |
| 7,348,747 | B1* | 3/2008 | Theobold | B25J 5/005 318/568.11 |
| 7,689,321 | B2* | 3/2010 | Karlsson | G05D 1/0246 318/103 |
| 9,283,674 | B2* | 3/2016 | Hoffman | B25J 9/1671 |
| 2005/0004708 | A1 | 1/2005 | Goldenberg et al. | |
| 2005/0182518 | A1* | 8/2005 | Karlsson | G05D 1/0246 700/253 |
| 2005/0234679 | A1* | 10/2005 | Karlsson | G05D 1/0272 702/181 |
| 2007/0008918 | A1 | 1/2007 | Stanforth | |

OTHER PUBLICATIONS

The International Bureau, Notification Concerning Submission, Obtention or Transmittal of Priority Document for PCT/CA2011/050671, mail date Feb. 3, 2012.

IP Australia, Patent Examination Report No. 2 for Application No. 2011320086, Mail Date Jun. 15, 2016.

* cited by examiner

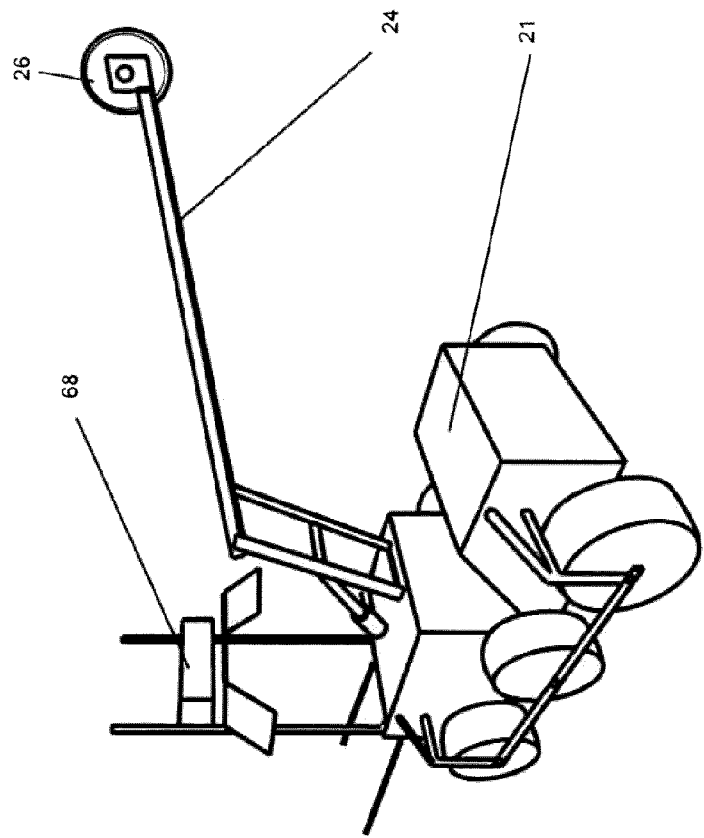
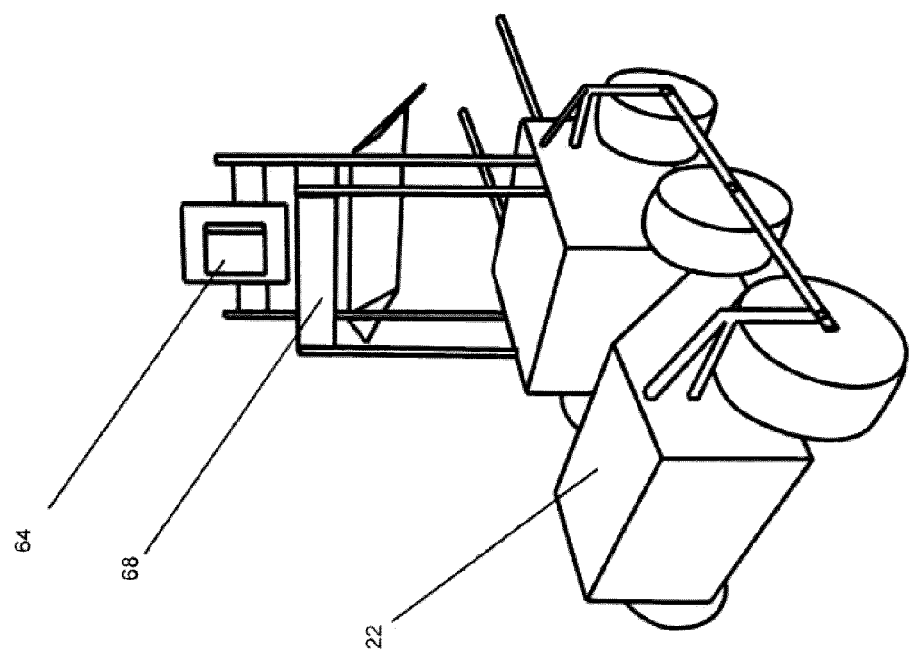
Fig.3

TELEROBOTIC COMMUNICATIONS SYSTEM AND METHOD

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This application is a National Stage of Application PCT/CA2011/060571, filed Oct. 26, 2011, which claims priority to Canadian Patent Application No. 2718870, filed Oct. 26, 2010, which are incorporated herein by reference.

FIELD OF THE INVENTION

This invention relates to communications systems. In particular, this invention relates to a communications system for the teleoperation of mobile equipment particularly suitable for personnel hostile operational environments.

BACKGROUND OF THE INVENTION

In environments that are unsuitable or hostile for humans, telerobots are particularly suited to perform tasks that would otherwise be performed by humans. An example of such an inhospitable environment that would benefit from telerobotics is in the mining industry, when mines in a state of temporary suspension and no longer in operation become environments unsuitable for human activity. In such mines, the entire ventilation system of the mine is usually shut down, the ramp to enter the mine may become heavily eroded due to a lack of mine maintenance activity, and the crown pillar may become partially unstable. There may be no natural ventilation to support human life, no lighting, no temperature management, a build-up of toxic gases, fog and potentially high humidity. As a result, personnel entry is usually forbidden.

In such environments, for safety reasons, telerobotic entry may be the only means of investigating the facility and performing the work required. While a mine may be in a state of temporary suspension for a variety of reasons, such as an unstable crown pillar zone, the management of the mine will nevertheless need to continue to monitor various aspects of the mine's structure. One such monitoring task, for example, is updating previous cavity monitoring surveys to confirm that the mine has remained stable during any seismic activity or to assess longer term options for the site. Laser scanning may be required to survey the existing cavity to ensure that the open stope is not moving with time.

The effectiveness of a telerobotic system for such a task is affected by a number of aspects of the underground operational environment, including ground conditions, ventilation, underground air quality, ramp condition and slope, personal entry options, lighting conditions, radio absorption characteristics, temperature, safety considerations, laser scanning requirements, removal of barriers, ability to move the laser scanning units, and the need to position the laser for maximum information. All of these issues present limitations on the use of a telerobotics communications system in such an environment.

The telerobots must be able to navigate down the mine ramp to get to the cavity, which may be heavily eroded due to a lack of mine maintenance activity. The telerobots may need to navigate distances of more than 2 km into the rock body, including around various corners, to get to the cavity. During descent into the mine, barriers such as wire gates may need to be removed to get to the cavity of interest for scanning. The required tools and equipment, such as laser scanning equipment, must be mounted in a way that it can make the journey of potentially more than 2 km to the scanning site. Given the high costs associated with such technology and equipment, it is also important that the telerobots and other equipment can safely return to the surface. The ramp conditions and distance that must be traveled present difficulties with the use of wire cables to tether the telerobots during this process, in particular during retrieval of the cables for the return of the telerobots to the surface. Should the cables become tangled or snagged, the telerobots may not be recoverable. Of prime importance during all of the above activities is the need to communicate constantly with the telerobots for teleoperation and to perform the required tasks. Wireless communication in such environments is challenging due to radio wave absorption by the rock, which can be closely tied to metal content in the rock, and line-of-sight limitations of high-bandwidth wireless communications.

It would accordingly be advantageous to provide a telerobotic high bandwidth communications system that is reliable and capable of high data rates for use in environments that are unsuitable for humans, such as hostile mine environments.

BRIEF DESCRIPTION OF THE DRAWINGS

In drawings which illustrate by way of example only a preferred embodiment of the invention.

FIG. 3 is a perspective view of another embodiment of the communications telerobot of the invention and another embodiment of the worker telerobot of the invention;

DETAILED DESCRIPTION OF THE INVENTION

Figure 1:
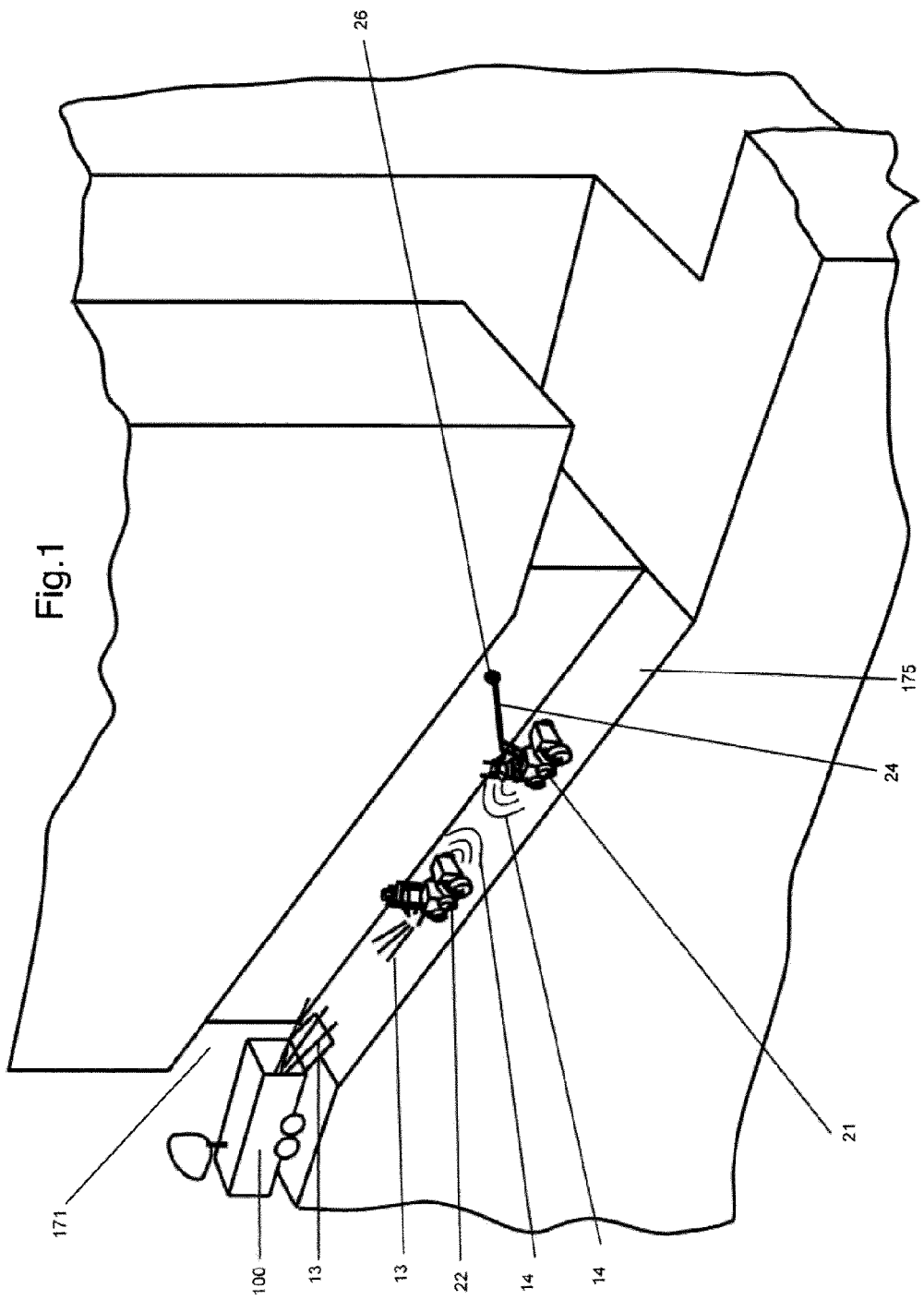
FIG. 1 is a partially enlarged perspective view of an embodiment of a telerobotic communications system according to the invention.

The present invention provides a telerobotic communications system, one embodiment of which is illustrated in FIG. 1, and a telerobotic communications method, which is adaptable to virtually any environment and is particularly suitable for environments that are inhospitable to humans, including (without limitation) certain mine environments. The system and method of the invention will be described in the context of mining, but it has applications in other environments and the description is not intended to be limiting in this regard. The system and method of the invention has application in most types of environments, and is particularly advantageously utilized in those that are hostile or dangerous for human activity, such as environments with toxic gases, extreme high or low temperatures, radioactivity, harmful solar irradiation, and so on. This includes, for example, outer space as well as the surface and sub-surface of other astronomical bodies, such as the moon. The system and method of the invention also has application in underwater environments using, for example, optical communication. Another example of an environment wherein the system of the invention may benefit from the use of optical communication is in coal mines where there is a risk that sparks created by radio signals may ignite ambient gases. The system and method of the invention also has application in environments with an inherent and imminent risk of harm, such as law enforcement, hazardous materials handling, avalanche zones, mudslide zones, landslide zones, volcanic areas, and so on. While the system and method of the invention is particular suited for hostile or dangerous environments, it may also be used in lieu of human activity for other reasons, such as for example prolonged field work in remote locations.

Figure 2:
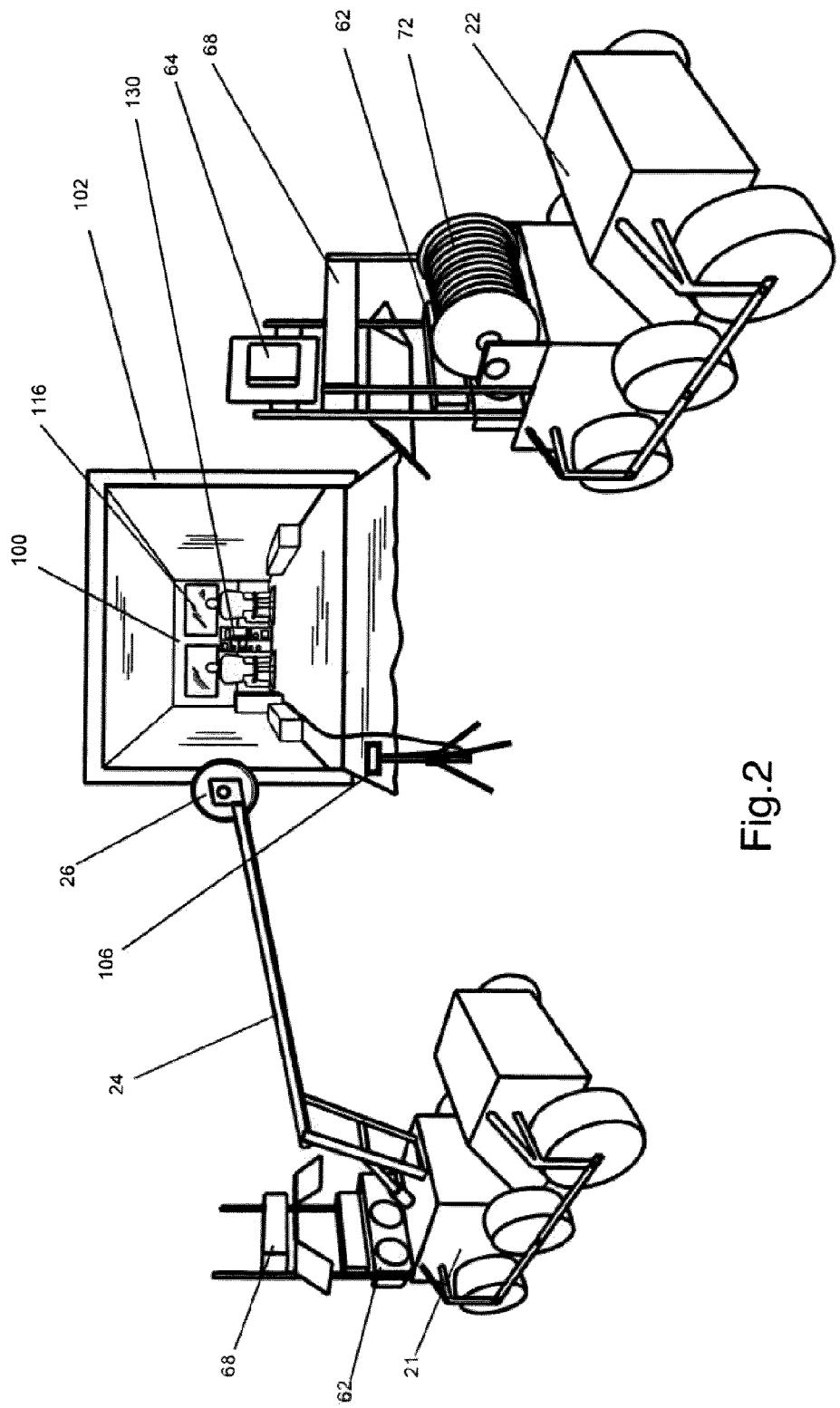
FIG. 2 is a perspective view of an embodiment of the communications telerobot of the invention and an embodiment of the worker telerobot of the invention.

One embodiment of the present invention provides a telerobotic communications system for the control of at least two telerobots 21, 22, embodiments of which are illustrated in FIGS. 2 and 3. While this embodiment is described for the control of two telerobots 21, 22, it will be appreciated by the person skilled in the art that the telerobotic communications system of the invention may be used for the control of any number of telerobots, as desired.

Figure 4:
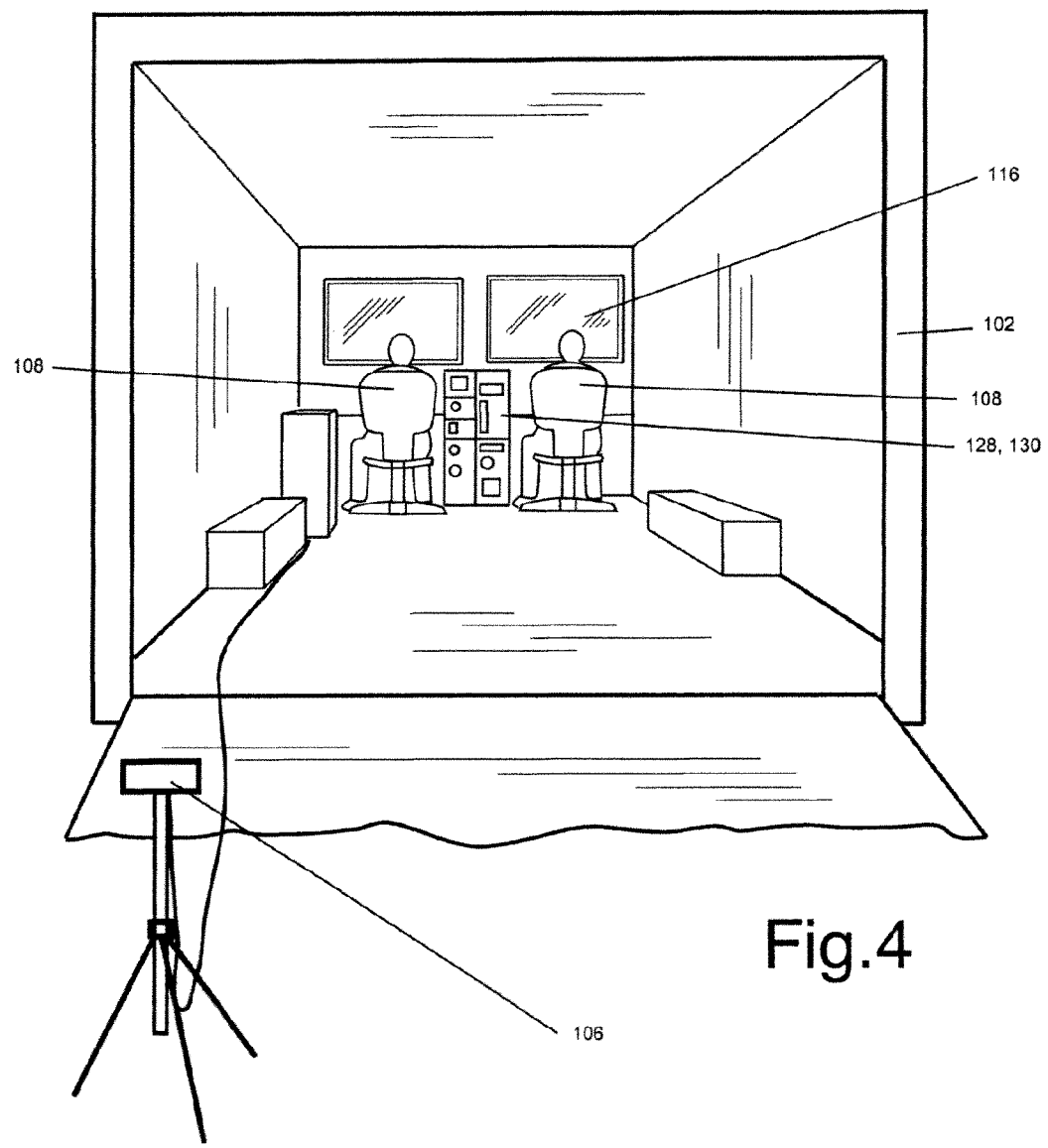
FIG. 4 is a perspective view of an embodiment of the teleoperations centre of the invention mounted in a trailer.

The system includes a control centre or teleoperation centre 100, in the embodiment illustrated having two robot control stations 104 for the teleoperation of a pair of robots 21, 22 (for example a worker robot 21, sometimes referred to herein as a 'workbot 2, and a communications robot 22, sometimes referred to herein as a 'combot 22'). The teleoperation centre 100, one embodiment of which is illustrated in FIG. 4, may be contained within a mobile trailer 102 located on or off site connected to, or in communication with, a long distance directional transmitter/receiver antenna 106 located at the portal 171 of the mine 170 as shown in FIG. 1. Communication between the teleoperation centre 100 and the combot 22 is accomplished with long distance wireless communication 13, preferably (but not necessarily) via a long distance directional transmitter/receiver antenna 64 as shown, while communication between the combot 22 and the workbot 21 may be accomplished with local or short distance wireless communications links 14. With the long distance directional transmitter/receiver antenna 106 set up at the portal entrance 171, the robots 21, 22 can enter the mine 170 once the long distance communications link 13 with the teleoperation centre 100 is established.

Figure 5:
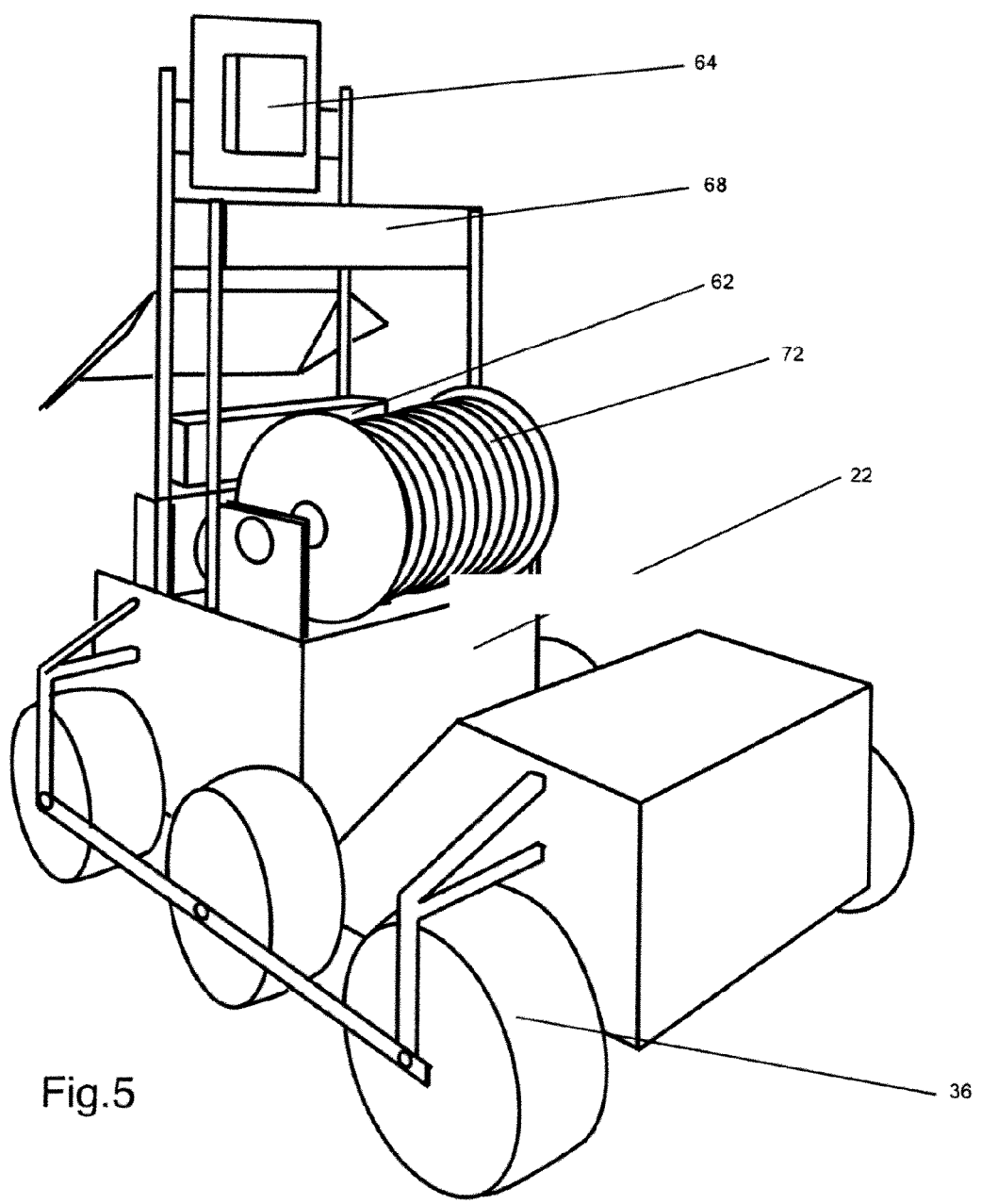
FIG. 5 is a perspective view of an embodiment of the communications telerobot of the invention with a backup cable spool.
Figure 6:
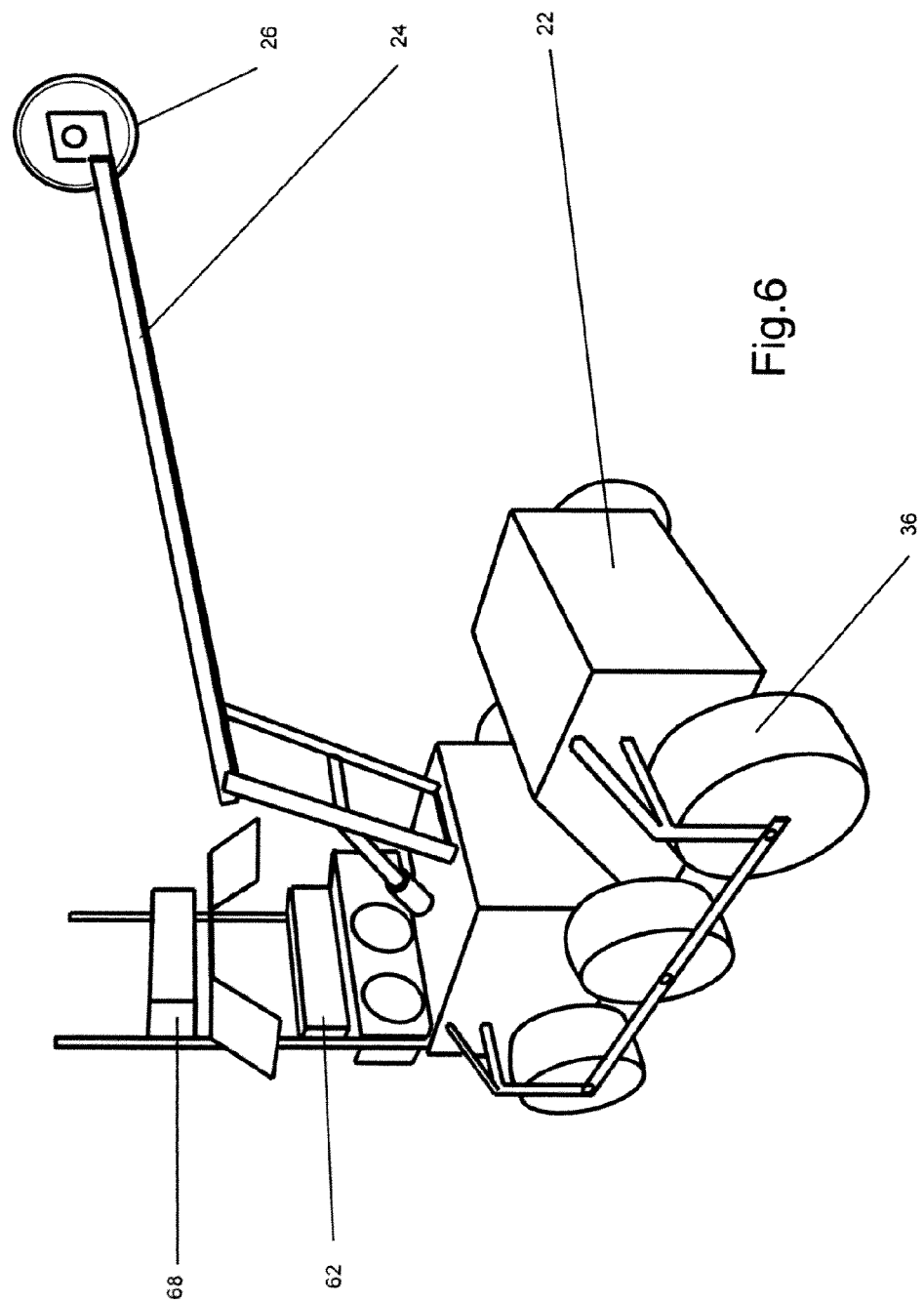
FIG. 6 is a perspective view of an embodiment of the worker telerobot of the invention with a grinding tool.
Figure 7:
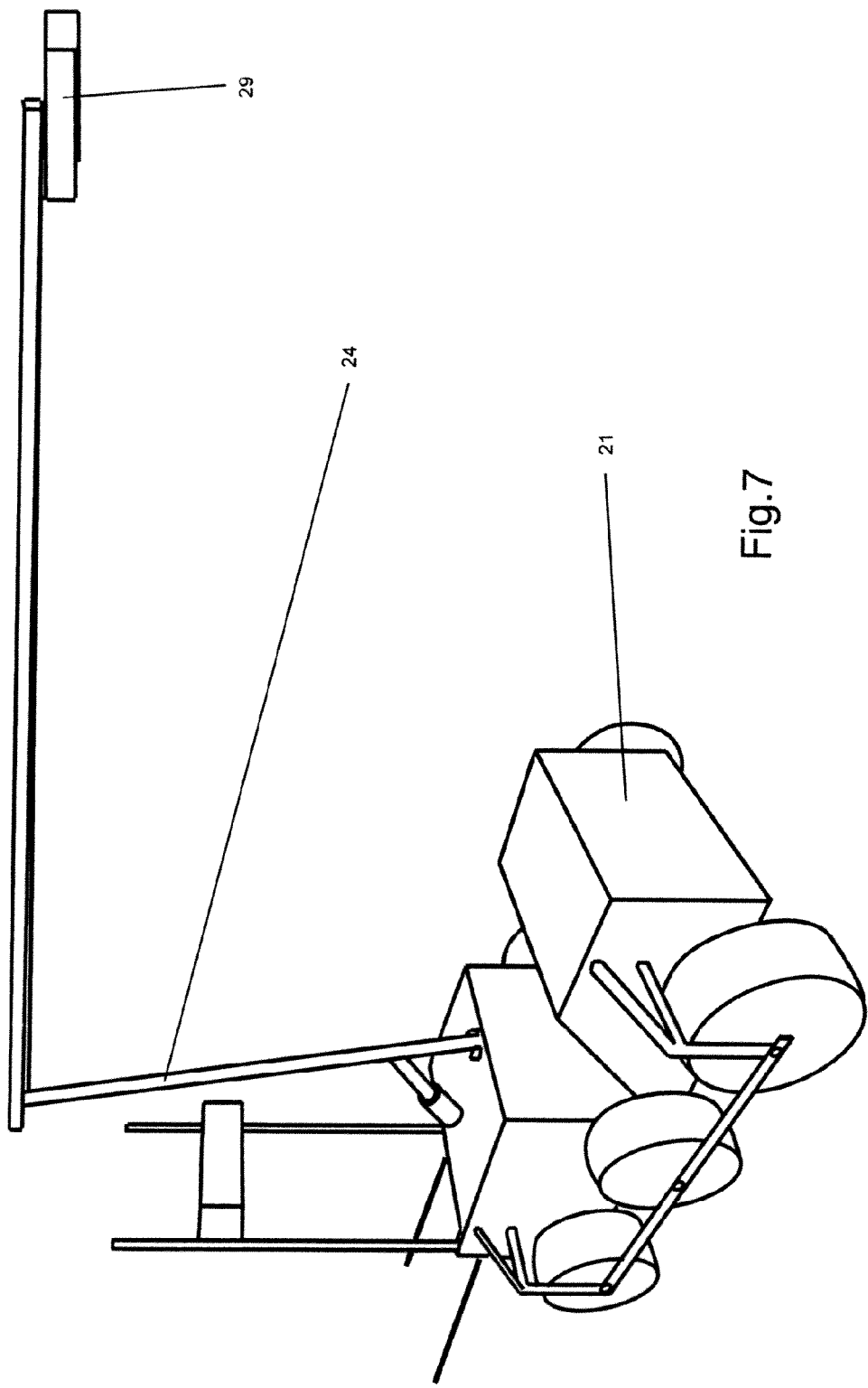
FIG. 7 is a perspective view of an embodiment of the worker telerobot of the invention with a scanning tool.

The communications telerobot 22 ('combot 22') of the invention, one embodiment of which is illustrated in FIG. 5, maintains a constant telecommunications link 12 back to the teleoperation centre 100, preferably having a data rate of at least 10 mb/s. The second telerobot or worker telerobot 21 ('workbot 2), one embodiment of which is illustrated in FIG. 6, supports the equipment and/or tools necessary to do the required task. In the context of mine cavity 172 scanning, these tools may include a cutting arm 24 (as shown on the embodiment of the workbot 21 illustrated in FIG. 6) or a boom 28 for a laser scanner 29 to be placed a selected distance (for example 30 feet) into the open stope 172 for scanning (as shown on the embodiment of the workbot 21 illustrated in FIG. 7), which would be fitted to the workbot 21 prior to entering the mine 170. The workbot 21 may have special actuating systems 30 to cut safety screen 173 out of the way and a second system 32 to perform the laser scan of the stope 172, and any other equipment or tools needed for the task.

Figure 8:
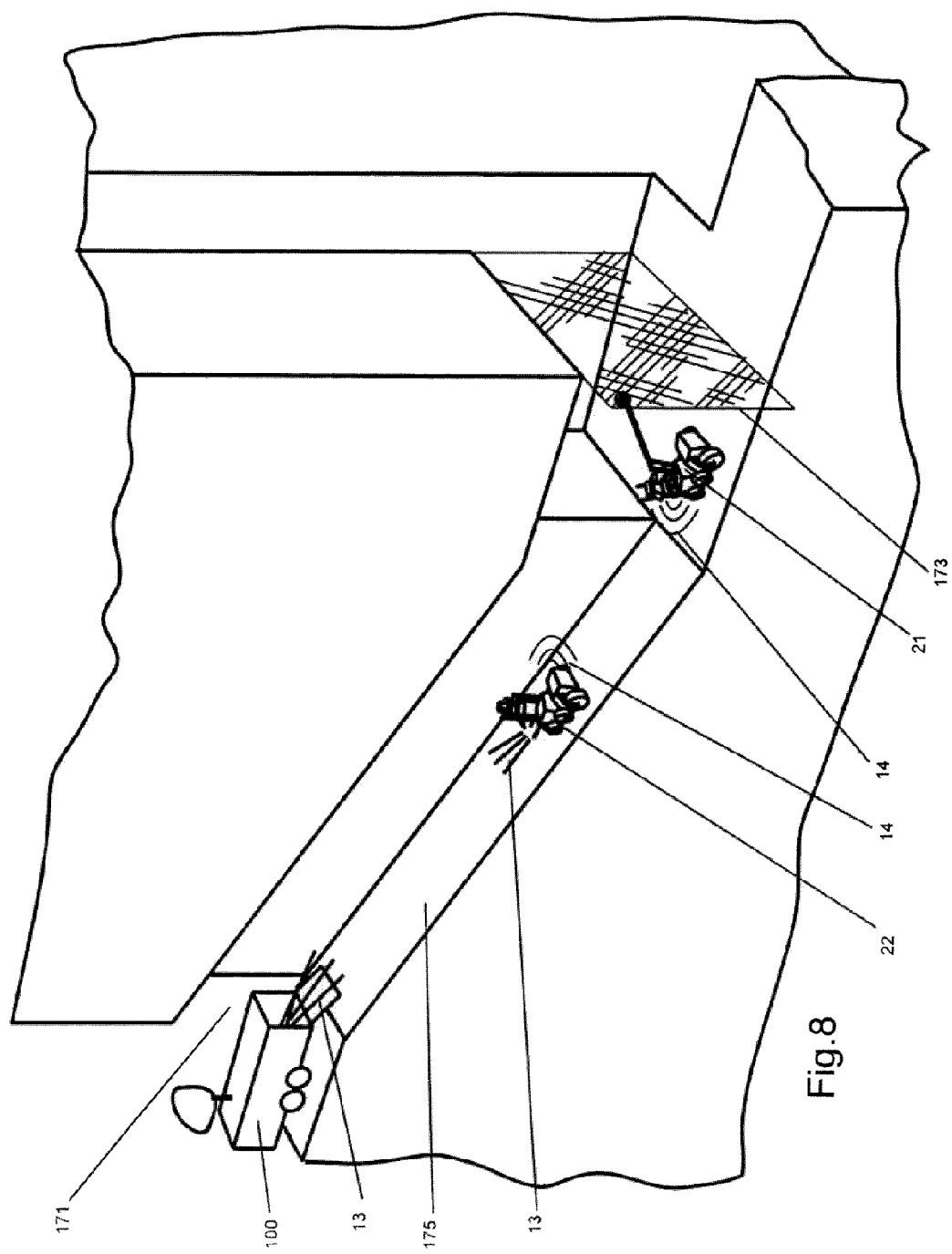
FIG. 8 is a partially enlarged perspective view of an embodiment of the telerobotic communications system according to the invention showing communication between the teleoperation centre and the communications telerobot and communication between the communications telerobot and the worker telerobot.

FIG. 8 illustrates the telerobots 21, 22 after they have descended into the mine 170. The combot 22 is established at a point that supports a stable communication link 12 with the teleoperation centre 100. The use of directional wireless communications 15 for this potentially allows the combot 22 to descend well into the mine 170. Short distance communication 14 is used to relay control data 16 from the combot 22 (which in turn was received by the combot 22 via long distance communication 13 from the teleoperation centre 100) to the workbot 21, which continues into the mine 170 to, for example, remove the mine's safety screen 173. This may be accomplished with a grinder tool 26 affixed to the workbot 21 to cut the safety screen 173. Once this is complete, depending on the available battery life, the workbot 21 and combot 22 may be returned to the surface 174 to have their batteries 42 recharged. After recharging, if necessary, the telerobots 21, 22 may re-establish their previous position in the mine.

Figure 9:
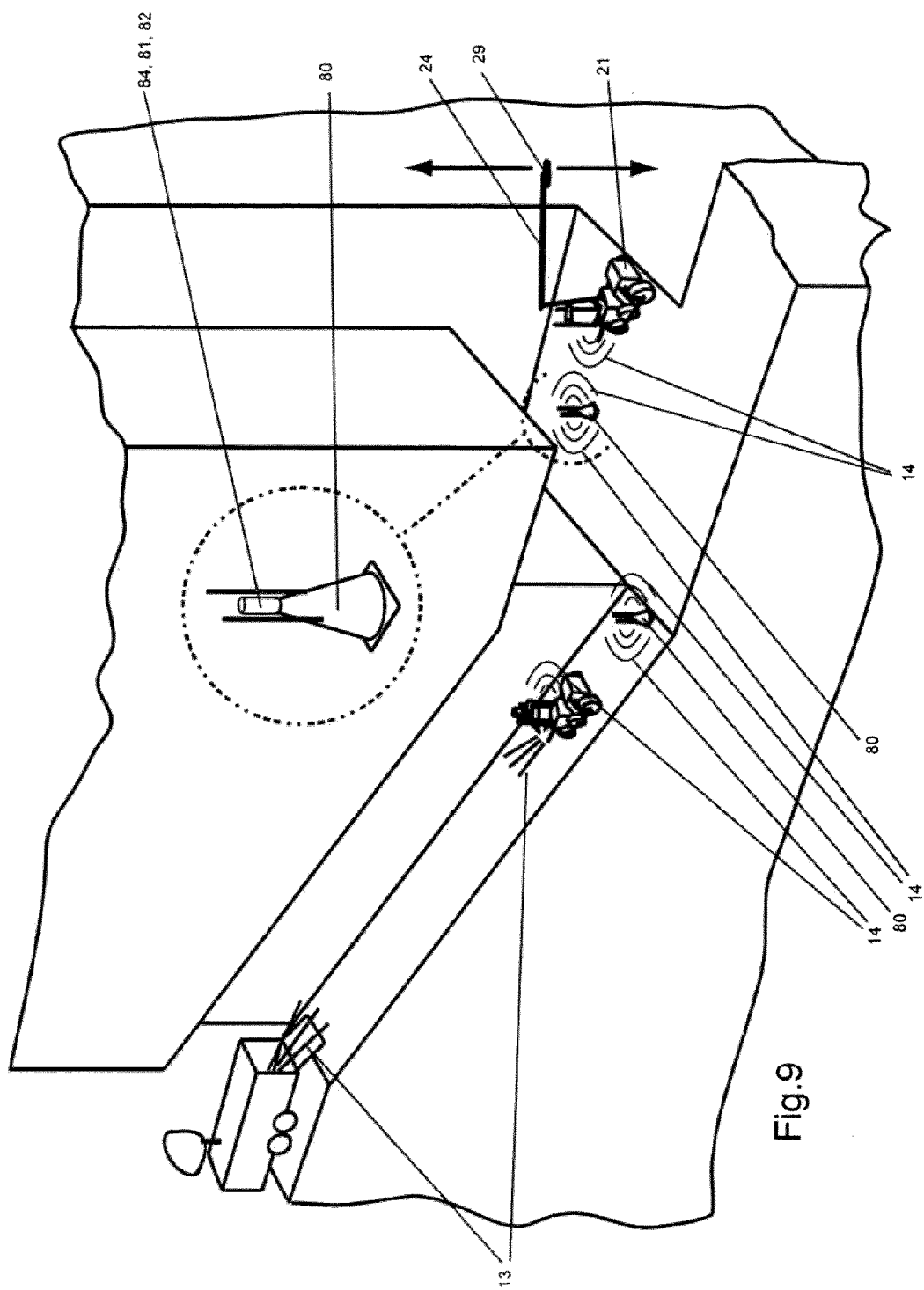
FIG. 9 is a partially enlarged perspective view of an embodiment of the telerobotic communications system according to the invention showing repeaters for communication between the communications telerobot and the worker telerobot.

FIG. 9 illustrates an embodiment of the telerobotic communications system of the invention that includes WiFi communication repeater modules 80 ("repeaters 80"), battery 42 operated or otherwise, to relay control data 16 from the combot 22 to the workbot 21 using wireless communications 12. These repeaters 80 are dropped or otherwise positioned within a communications-enabled distance 154 from the combot 22 or another repeater 80, and thus provide a means to telerobotically build a wireless network 18 in the desired environment for communication and teleoperation using, for example, electromagnetic radiation such as radio 140, light 142, or microwave 144 signals for data transfer. The workbot 21 travels within a communications-enabled distance 154 from the combot 22 and continues on around the corner and into the open stope 173 for scanning, remaining within a communications-enabled distance 154 from a repeater 80 and thus in communication with the combot 22.

Repeater modules 80 can be deployed on a battery 90 operated basis or otherwise 92 to ensure communication network 18 continuity. The repeater modules 80 may comprise a dual wireless repeater bridge 82 (i.e. two wireless repeater bridges 81 connected back to back) to maximize the communications distance 154. In this configuration, one wireless repeater bridge 81 is pointing up the mine shaft 175 in one direction toward the combot 22 while the other wireless repeater bridge 81 is pointing down the mine shaft 175 toward the workbot 21. It will be appreciated by the skilled person that a single wireless repeater bridge 81 may also be used. The repeater modules 80 may, if necessary, be affixed to pylons 86 or some other means of stabilizing or elevating the repeaters 80 on the mine floor 176, for instance to prevent damage to the electronics 88 from flowing water or mud 177. The scanning operation will be operated from the teleoperation centre 100 via control data 16 relay through the combot 22 and repeater stations 80 to the workbot 21 and vice versa. Once the task is complete, the workbot 21 and combot 22 may return to the surface 174, collecting the repeater modules 80 along the way, as necessary.

In another embodiment of the communications system of the invention, the repeater modules 80 may be deployed to ensure communication network 18 continuity between the teleoperations centre 100 and the combot 22 and thereby extend the distance 154 that the combot 22 may travel from the teleoperations centre 100. It will be appreciated by the person skilled in the art that the frequency 19 of the repeater modules 80 used in this embodiment will vary depending on the frequencies being used for communication between the teleoperations centre 100 and the combot 22. In another embodiment, one or more repeater modules 80 may be used in lieu of a combot 22 to relay control data 16 from the teleoperations centre 100 directly to the workbot 21 and relay non-control data 17 from the workbot 21 back to the teleoperations centre 100.

Robotic units 21, 22 suitable for the telerobotic communications system of the invention may comprise an architecture platform 34 of a six wheeled chain drive system 38 that is capable of folding to cover deep ditch operation. The power plants 40 for both robots 21, 22 may be 12 gel cell batteries 42 with 16 hours of operational time at full load. The power plant system 40 has an optional diesel engine charging system 44 for the batteries 42 that extends the operational life of the robots 21, 22 to multiple days. Two low speed/high torque stepper motors 46 drive each unit 21, 22. Each unit 21, 22 is fit with front and back low light cameras 48 and LED headlights 50. The electronic control package 52 links to actuators 54 and sensors 56 on the robots 21, 22 using low latency electronic control units 58.

Figure 10:
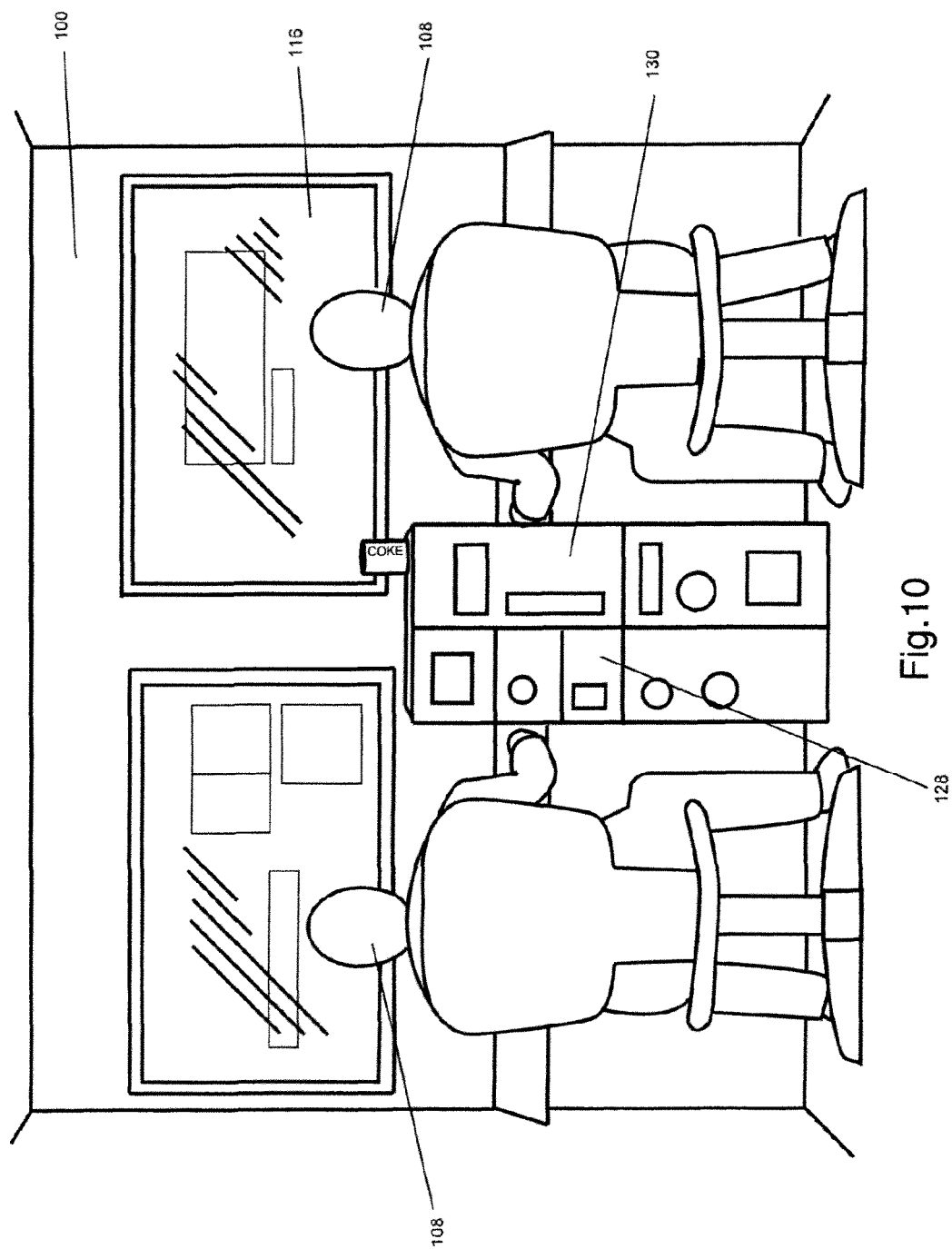
FIG. 10 is a perspective view of an embodiment of the teleoperations centre of FIG. 4.

FIG. 10 illustrates an embodiment of the teleoperation centre 100 of the invention. The teleoperation centre 100 may include one or more teleoperator workstations 104 (two in the embodiment shown), and a satellite uplink 110 or an underground network link 112 mounted on a tripod 114. Each teleoperator workstation 104 consists of a main display 116 and maintenance data display 118. The teleoperator interface 120 consists of an industrial track 122 and a pair of joysticks 124 along with a keyboard 126. The computer bank 128 may include three computers 130: two of the computers 130 are used to control the robot workstations 104; the third computer 130 is used to monitor the state of the underground network 18. It will be appreciated by the skilled person that the number of computers 130 in the computer bank 128 may vary as desired for the operation of the system. A display 132 is mounted between the main monitors so both teleoperators 108 can monitor network status.

According to the invention, a temporary network with the potential for unlimited length is established for the operation of the telerobotic communications system. With the use of repeaters 80, the invention provides a means of telerobotically building a wireless network 18 in the desired environment for communication and teleoperation that can extend over any distance, provided there are a sufficient number of repeaters 80 and sufficient battery life or another power source 92. While the wireless network 18 of the invention is described using radio signals 140, it will be appreciated by the skilled person that transceivers 66, 94 and repeaters 80 may be adapted to create a system that uses other electromagnetic radiation such as light 142 or microwave signals 144 for data transfer, or any combination of radio 140, light 142 or microwave 144. The wireless network 18 created according to the invention may allow for off-the-shelf machines 21, 22 to communicate using the network 18. In some embodiments of the combot 22 or workbot 21, onboard communication is also performed using a network, such that a network backbone runs the machine 21, 22 creating a telerobot 21, 22 with a network bus 60.

The electronics 62 of the system may utilize control-specific input/output streams and are low latency. The electronics 62 are designed to be high speed and fast processing and to minimize latency. In the embodiment shown, mounted on the combot 22 are two main communication components: the first is a long distance directional transmitter/receiver 64, and the second is a transceiver 66 connected to two local antennas 68, for example capable of approximately 300 meters of coverage circular around the machine 21, 22. A Cisco™ long distance antenna 64 meshed with short range broad coverage antennas 68 may be used with WiFi communications 12 for audio, data and video communication. Long distance WiFi communication 13 may be used providing for communication over distances of approximately 25 km, meshed with short haul WiFi communication 14 providing for communication over distances of approximately 300 m. The long distance antenna 64 has pitch and yaw directional motors 70 to tune in the radio signal 140 from the teleoperation centre 100 high capacity antenna 106.

As illustrated in FIG. 5, the combot 22 is also optionally fitted with a 1 km or more backup cable Ethernet network extension system 72. This system has an industrial winder 76 with two-pair network extender electronics 78. The combot 22 illustrated in FIG. 3 is an embodiment without the backup cable system 72. Mounted on the workbot 21 is also a short range broad coverage antenna 68 for receiving control data 16 from the teleoperation centre 100 indirectly by way of the combot 22, as well as transmitting audio, data and video back to the teleoperation centre 100 indirectly by way of the combot 21. The 'relay' of the workbot 21 control data 16 from teleoperation centre 100 via the combot 22 to the workbot 21 and the 'relay' of the non-control data 17 from the workbot 21 to the teleoperation centre 100 via the combot 22 may be accomplished using at least one transmitter and receiver, or at least one transceiver on the combot 22. For instance, at least one transceiver or receiver may be used to receive workbot 21 control data 16 from teleoperation centre 100 and the same or different transceiver or transmitter may be used to transmit control data 16 to the workbot 21 that either represents the workbot 21 control data 16 from teleoperation centre 100 or is the same as the workbot 21 control data 16 from teleoperation centre 100. The same transceiver or receiver, or a different transceiver or receiver, may be used to receive non-control data 17 from the workbot 21 and the same transceiver or transmitter, or a different transceiver or transmitter, may be used transmit non-control data 17 that either represents the workbot 21 non-control data 17 or is the same as the workbot 21 non-control data 16, which wireless communication is received by the teleoperation centre 100. A repeater on the combot 22 may also be used to relay the control data 16 to the workbot 21 and non-control data 17 from the workbot 21 in some embodiments. A repeater, transceiver or transmitter/receiver combination may also be used on the workbot 21 to 'relay' control and non-control data to or from, respectively, a second workbot 21 operating deeper into the mine in the same manner.

Limitations to the delay threshold for the long distance communication 13 between the combot 21 and teleoperations centre 100 may be encountered due to curvature of the ramp 175, reducing the distance available for line-of-sight communications. To accommodate for such limitations, the 2.4 GHz communications band range, which is direction sensitive, may be varied to for example 900 MHz or 450 MHz, which are less direction-sensitive. By using various frequencies simultaneously, one can advantageously flood the coverage area 156 to maximize the wireless network 18 created. The electronics 62 used in the system may be designed to support the use of various frequencies in this manner.

In addition to the fixed assets on the combot 22, a number of portable repeaters 80 may be deployed, as described above. These units may consist of a battery 90 operated transceiver 94, a wireless repeater bridge 81, or dual wireless repeater bridge 82, with a pair of antennas 84 mounted on, for example, a pylon 86 with the electronics 88 mounted inside the pylon 86. Preferably, the life of these units is 24 hours. For convenience, these may be deployed by the workbot 21 robot arm 24. In some embodiments, the workbot 21 has the ability to mount several portable repeaters or extenders 80 for transport. These units may be placed at important positions 158 to support network growth and operational objectives to be achieved.

The workbot 21 can be fitted with any number of actuator 54 systems on the basic telerobotic platform 34 discussed earlier. In the case of laser cavity scanning system, four functions are provided: (1) the ability to deploy and retrieve temporary network extenders 80; (2) the ability to cut and remove mine safety fencing 173; (3) the ability to carry, deploy, extend, operate and retrieve the laser scanner 29; and (4) the ability to drop and pick the network extenders 80 at any given location of the operational environment.

FIG. 8 illustrates an example of a teleoperation robot 21 with an actuator arm 24 or 'robot arm' mounted on the unit 21. The robot arm 24 is capable of raising, lowering, extending and retracting. The end of the robot arm 24 is capable of holding hand tools such as the grinder 26 needed to remove a metal safety fence 173. This capability may require separate batteries 42 and power inverters 74. FIG. 9 illustrates the same basic telerobot 21 with a different version of the robot arm 24. This robot arm 24 is capable of mounting an 8 meter arm 28 with a laser scanner 29 on the end of the unit 21, developed to support extending the laser scanner 29 into the cavity 172 for profiling.

In the context of mine cavity scanning, according to the invention the teleoperations centre 100 may be placed near the mine portal 171 as shown in FIG. 10. A directional antenna 106 may be connected to the teleoperations centre 100 directly or remotely, which may be positioned at the portal opening 171 and positioned to point down the ramp 175. Once this transceiver had been initiated 106, the combot 22 may begin to create the network links 12.

The initial system setup includes powering up of the combot 22 and workbot 21. The telerobots 21, 22 then travel together (or at least within communications-enabled distance 154 of one another) to the furthest point 160 the combot can travel while maintaining a sufficient network connection with the teleoperations centre 100. The combot 22 then provides a communications relay point 160 established in the ramp 175 at the maximum network delay threshold, which may for example be 250 meters or more down the mine ramp 175. The workbot 21 continues down the ramp 175, optionally with the battery operated repeaters 80 to be deployed. The battery operated repeaters 80 may be deployed when the new maximum network delay threshold is reached by the workbot 21, for example every 150 meters (indicating that the workbot is approaching the periphery of the communications-enabled distance 154). The workbot 21 then continues until either a new maximum network delay threshold, at which point a second battery operated repeater 80 would be deployed, or until, for example, the safety fence 173 is reached. The workbot 21 may then remove the safety fence 173 using the grinder arm 24 to make it passable. The workbot 21 then continues until either a new maximum network delay threshold, at which point a subsequent battery operated repeater 80 would be deployed, or the final destination 162 is reached.

Depending on the battery life of the workbot 21, combot 22, or repeaters 80, the workbot 21 and combot 22 may need to be returned to the surface 174, optionally collecting the battery operated repeaters 80, for recharging. While at the surface 174, the workbot's 21 grinder arm 24 may be replaced by a laser scanning arm 28. Once the telerobots 21, 22 and repeaters 80 are recharged, if necessary, the units 21, 22, 80 and network 18 are powered up and the units 21, 22, 80 are deployed back down the ramp 175. Upon redeployment into the mine 170, repeaters 80 may be redeployed to extend the network 18 for the workbot 21, as necessary.

Extending the maximum network delay threshold as necessary by deployment of battery operated repeaters 80, the workbot 21 travels to open stope 172 to be scanned. The workbot 21 then undertakes scanning to collect the stope profile. The repeaters 80 may be collected during the workbot's 21 return to the surface 174 with the combot 22.

According to this embodiment of the invention, no operators 108 are required to enter the mine ramp 175 and both telerobots 21, 22 may be operated for at least 8 hours of continuous operation. A total of 1.2 km or more may be traversed using teleoperation with a remotely deployed communication system.

Various embodiments of the present invention having been thus described in detail by way of example, it will be apparent to those skilled in the art that variations and modifications may be made without departing from the invention. The invention includes all such variations and modifications as fall within the scope of the appended claims.

I claim:

1. A telerobotic communications system comprising,
   a first mobile telerobot and at least a first deployable repeater module mounted to the first mobile telerobot;
   a wireless communication network; and
   a teleoperation centre to transmit control data over the wireless communication network and to receive non-control data over the wireless communication network, wherein
   the control data comprises at least first mobile telereobot control data and the non-control data comprises at least first mobile telerobot non-control data;
   the first mobile telerobot comprising
      a transceiver to receive the first mobile telereobot control data over the wireless communication network and to transmit the first mobile non-control data over the wireless communication network, and
      an actuator capable of deploying the at least first deployable repeater module;

the at least first deployable repeater module comprising
  a repeater to relay control data and non-control data over the wireless communication network;
wherein the first mobile telerobot deploys the at least first deployable repeater module upon sensing that a maximum network delay has been reached; and
wherein the wireless communication network comprises a wireless connection established between the teleoperation centre and the at least first deployable repeater module and a wireless connection established by the at least first deployable repeater module.

2. The telerobotic communications system of claim 1, wherein the wireless connection established by the at least first deployable repeater module is with the first mobile telerobot.

3. The telerobotic communications system of claim 1, further comprises a second mobile telerobot, wherein
  the control data comprises at least second mobile telereobot control data and the non-control data comprises at least second mobile telerobot non-control data;
  the second mobile telerobot comprising
    a transceiver to receive the second mobile telerobot control data over the wireless communication network and to transmit second mobile non-control data over the wireless communication network.

4. The telerobotic communications system of claim 3, wherein the wireless connection established by the at least first deployable repeater module is with the second mobile telerobot.

5. The telerobotic communications system of claim 3, wherein the wireless connection established by the at least first deployable repeater module is with the first mobile telerobot and the wireless communications network further comprises a wireless connection established between the first mobile telerobot and the second mobile telerobot.

6. The telerobotic communications system of claim 3 further comprises at least a second deployable repeater module mounted to the second mobile telerobot;
  the second mobile telerobot further comprising
    an actuator capable of deploying the at least second deployable repeater module;
  the at least second deployable repeater module comprising
    a repeater to relay control data and non-control data over the wireless communication network;
  wherein the second mobile telerobot deploys the at least second deployable repeater module upon sensing that a maximum network delay has been reached; and
  wherein the wireless communication network further comprises the wireless connection established between the at least first deployable repeater module, the at least second deployable repeater module, the first mobile telerobot, and the second mobile telerobot.

7. The telerobotic communications system of claim 1 wherein the actuator of the first mobile telerobot is further capable of collecting the at least first deployable repeater module when returning to the teleoperation centre.

8. The telerobotic communications system of claim 6 wherein the actuator of the second mobile telerobot is further capable of collecting the at least second deployable repeater module.

9. A telerobotic communications system comprising,
  a plurality of mobile telerobots and a plurality of deployable repeater modules mounted to the plurality of mobile telerobots;
  a wireless communication network; and
  a teleoperation centre to transmit control data over the wireless communication network and to receive non-control data over the wireless communication network, wherein:
  the control data comprises control data for each of the plurality of telereobots and the non-control data comprises non-control date from each of the plurality of telerobots;
  the plurality of mobile telerobots each comprising
    a transceiver to receive control data over the wireless communication network and to transmit the non-control data over the wireless communication network, and
    an actuator capable of deploying one of the plurality of deployable repeater modules;
  the plurality of repeater modules each comprising
    a repeater to relay control data and non-control data over the wireless communication network;
  wherein the plurality of mobile telerobots deploy a repeater module of the plurality of repeater modules upon sensing that a maximum network delay has been reached; and,
  wherein the wireless communication network comprises a wireless connection established between the teleoperation centre, the plurality of mobile telerobots, and the deployed repeater modules of the plurality of repeater modules.

10. The telerobotic communications system of claim 9 wherein the actuator of each of the plurality of mobile telerobots is further capable of collecting the deployed repeater modules of the plurality of repeater modules.

* * * * *